E. H. Foote,
Dressing Stone.
No. 12,147. Patented Jan. 2, 1855.
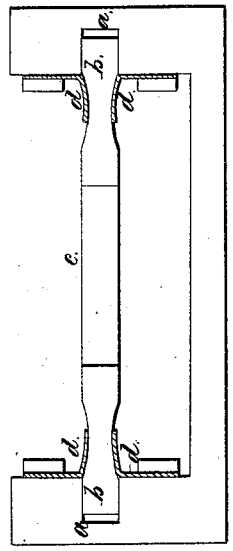
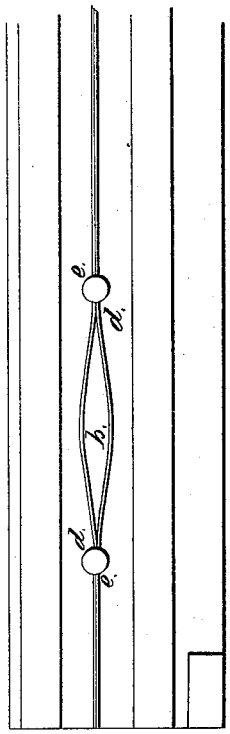
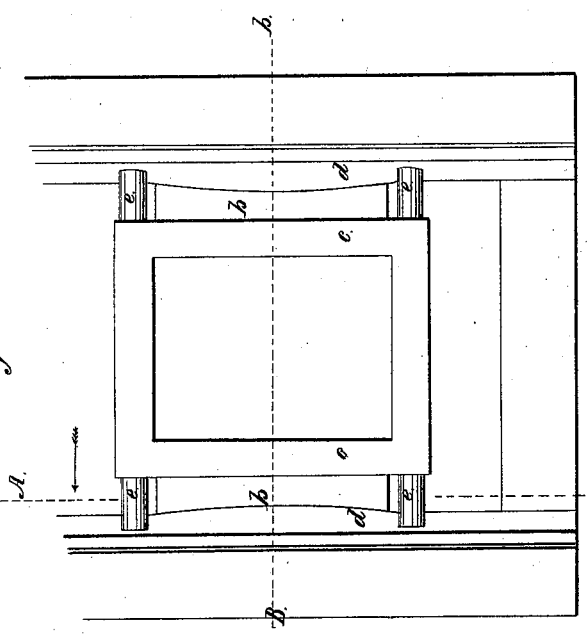
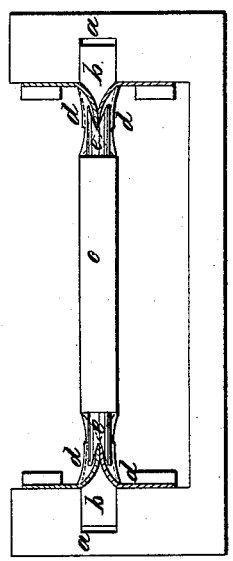

UNITED STATES PATENT OFFICE.

EDW. H. FOOTE, OF NEW YORK, N. Y.

PROTECTING SLIDES AND WAYS FROM DUST.

Specification of Letters Patent No. 12,147, dated January 2, 1855.

*To all whom it may concern:*

Be it known that I, EDWARD H. FOOTE, of Hartford, Connecticut, have invented a certain new and Improved Method of Protecting the Slides and Ways of Machinery Against Dust, of which the following is a full, clear, and exact description, reference being had to the accompanying drawings, making part of this specification, in which—

Figure 1, is a plan; Fig. 2, an end elevation; and Fig. 3, a vertical section taken at the line A, a, Fig. 1.

The same letters indicate like parts in all the figures.

My invention is mainly intended for protecting the ways and slides of stone dressing machines against the deposit which has such an injurious effect upon them. But my said invention is also applicable to the slides and ways of other machines exposed to dust. And my said invention consists in the employment of flexible guards to inclose the ways and slides of machinery, which guards consist of strips of vulcanized india rubber or other flexible substance which is impervious to dust, and causing the two strips to lap over the end of the cross head or other slide, and closing them on each side of the cross head by means of a clasp or pair of clasps on each side of the cross head or slide, which clasps embrace the two strips and bring their edges together, and thus exclude the dust.

In the accompanying drawings a, a, represents the two grooves or hollow ways to which are fitted the two ends b, b, of a cross head c, or sliding frame so that they can slide therein. To the upper and lower edges of the grooves or hollow ways, are secured strips d, d, of thin vulcanized india rubber, so inclined toward each other that they shall come together at their un-attached edges, and thus inclose the ways, and embrace the cross head, which latter is flared or beveled off to an edge each way, from the middle, and at top and bottom. This will permit the two strips of india rubber to come together before and behind the cross head; and to cause them to come together, on each side of the cross head, there is a clasp e, that is a piece grooved out to embrace the two edges where they come together, and thus completely closing the ways and slides, so that dust shall not enter.

It will be obvious that the same device can be applied to projecting as well as grooved ways, and in fact to all ways and slides.

I do not wish to be understood as limiting myself to the use of vulcanized india rubber, for any other flexible substance which is impervious to dust will answer the purpose although I prefer vulcanized india rubber.

I contemplate in some instances making the clasps with two rollers, to avoid friction in closing together the two strips or guards.

I am aware that the slot in the upper part of the tube, in atmospheric railways, through which passes the stem which connects the piston inside the tube with the car on the rails above, has been closed to exclude the air by means of a flexible valve or valves which is kept closed before and behind the said stem as it travels along, the said valve yielding to the motion of the stem. And I am also aware that dust has been kept out of journal boxes by surrounding the journal with a leather collar, and therefore I do not claim broadly excluding dust from mechanism by such means, but What I do claim as my invention and desire to secure by Letters Patent is—

The combination of the flexible guards which inclose the ways of slides in machinery, substantially as specified, in combination with the cross head and the clasps or their equivalents substantially as specified.

EDWARD H. FOOTE.

Witnesses:
ABNER WATERS,
G. B. D. FORER.